(12) United States Patent
DaCosta et al.

(10) Patent No.: US 7,237,428 B2
(45) Date of Patent: *Jul. 3, 2007

(54) FUEL GAUGE FOR HYDROGEN STORAGE MEDIA

(75) Inventors: David H. DaCosta, Central Valley, NY (US); P. Mark Golben, Florida, NY (US); David C. Tragna, West Milford, NJ (US)

(73) Assignee: Hera USA, Inc., Ringwood, NJ (US)

( * ) Notice: Subject to any disclaimer, the term of this patent is extended or adjusted under 35 U.S.C. 154(b) by 242 days.

This patent is subject to a terminal disclaimer.

(21) Appl. No.: 10/833,672

(22) Filed: Apr. 28, 2004

(65) Prior Publication Data

US 2004/0200735 A1    Oct. 14, 2004

Related U.S. Application Data

(63) Continuation of application No. 09/981,145, filed on Oct. 16, 2001.

(51) Int. Cl.
*G01F 17/00* (2006.01)
(52) U.S. Cl. ..................... 73/19.07; 206/0.7
(58) Field of Classification Search ............ 73/149, 73/19.07; 206/0.7
See application file for complete search history.

(56) References Cited

U.S. PATENT DOCUMENTS 1,629,063 A    5/1927   Berry 3,516,263 A    6/1970   Wiswall, Jr. et al.

(Continued)

FOREIGN PATENT DOCUMENTS

JP              163190       9/1983

(Continued)

OTHER PUBLICATIONS

Mark Golben and David DaCosta; "Advanced Thermal Hydrogen Compression"; *Society of Automotive Engineers, Inc.*, 1999 (Reprint).

(Continued)

*Primary Examiner*—Hezron Williams
*Assistant Examiner*—Paul M. West
(74) *Attorney, Agent, or Firm*—IPHorgan, Ltd.; Vangelis Economou; Sean S. Swidler

(57) ABSTRACT

A hydrogen gas storage container has a canister with at least one outlet opening for charging and discharging gas, the canister enclosing a metal hydride capable of absorbing and desorbing hydrogen gas and a gauge for measuring the capacity of hydrogen remaining within the hydride material. To further permit distribution of the hydrogen throughout the hydride material, a porous matrix may be disposed within said metal hydride material for providing efficient distribution of hydrogen gas to said metal hydride material. The fuel gauge may further comprise subassemblies for determining the hydrogen capacity, each of which depends for operation on a different property of the metal hydride material. For example, a pressure gauge sensitive to the plateau pressure indicative of the hydrogen capacity, a piezoelectric sensor that in combination with a rigid chamber in which hydride material is closely packed provides a pressure differential indicative of hydrogen capacity, or a resistivity sensor that in combination with a chamber in which hydride material is packed provides a resistance differential indicative of hydrogen capacity.

18 Claims, 3 Drawing Sheets

U.S. PATENT DOCUMENTS

| | | |
|---|---|---|
| 4,036,944 A | 7/1977 | Blytas |
| 4,039,023 A | 8/1977 | McClaine |
| 4,165,569 A | 8/1979 | Mackay |
| 4,216,198 A | 8/1980 | Simons |
| 4,282,931 A | 8/1981 | Golben |
| 4,377,209 A | 3/1983 | Golben |
| 4,385,494 A | 5/1983 | Golben |
| 4,393,924 A | 7/1983 | Asami et al. |
| 4,396,114 A | 8/1983 | Golben et al. |
| 4,457,136 A | 7/1984 | Nishizaki et al. |
| 4,505,120 A | 3/1985 | Golben |
| 4,566,281 A | 1/1986 | Sandrock et al. |
| 5,046,247 A | 9/1991 | Oguro et al. |
| 5,047,301 A | 9/1991 | Adlhart et al. |
| 5,063,749 A | 11/1991 | Manz |
| 5,250,368 A | 10/1993 | Golben et al. |
| 5,469,913 A * | 11/1995 | Gamou et al. ......... 165/104.12 |
| 5,471,881 A | 12/1995 | Hochstein |
| 5,518,528 A | 5/1996 | Tom et al. |
| 5,532,074 A | 7/1996 | Golben |
| 5,623,987 A | 4/1997 | Golben et al. |
| 5,673,556 A | 10/1997 | Golben et al. |
| 5,679,903 A | 10/1997 | Mock |
| 5,688,611 A | 11/1997 | Golben |
| 5,697,221 A | 12/1997 | Sapru et al. |
| 5,776,626 A | 7/1998 | Tsukahara et al. |
| 5,827,947 A | 10/1998 | Miller et al. |
| 5,882,384 A | 3/1999 | Tom |
| 5,895,861 A | 4/1999 | Slonaker |
| 5,906,792 A | 5/1999 | Schulz et al. |
| 6,094,983 A | 8/2000 | Pearl |
| 6,099,811 A | 8/2000 | Stetson et al. |
| 6,155,099 A | 12/2000 | Kobayashi et al. |
| 6,207,104 B1 | 3/2001 | Kadir et al. |
| 6,214,492 B1 | 4/2001 | Kono et al. |
| 6,222,204 B1 | 4/2001 | Teraguchi |
| 6,260,414 B1 | 7/2001 | Brown . |
| 6,267,229 B1 | 7/2001 | Heung |
| 6,695,061 B2 | 2/2004 | Fripp et al. |

FOREIGN PATENT DOCUMENTS

| | | |
|---|---|---|
| JP | 6-249777 | 9/1994 |

OTHER PUBLICATIONS

P. M. Golben; Multi-Stage Hydride-Hydrogen Compressor; *18th Intersociety Energy Conversion Engineering Conference*; pp. 1746-1753, Aug., 1983.

Sandrock et al., "Cyclic Life of Metal Hydrides with Impure Hydrogen: Overview and Engineering Considerations", *Journal of Less Common Metals*, vol. 154, pp. 159-173, (1984).

* cited by examiner

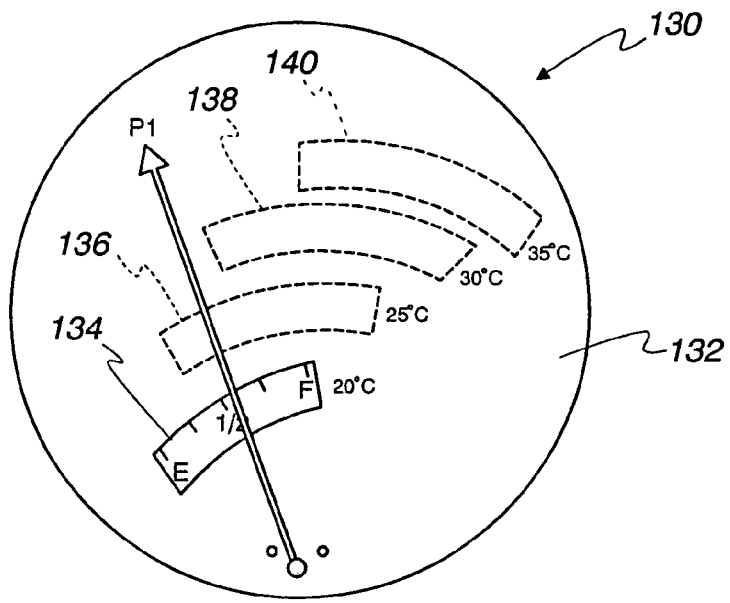
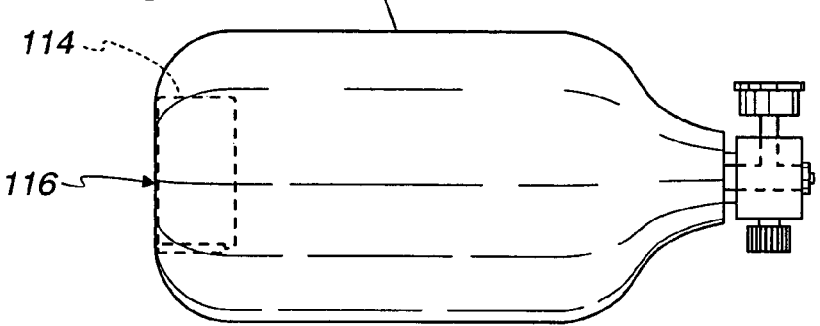
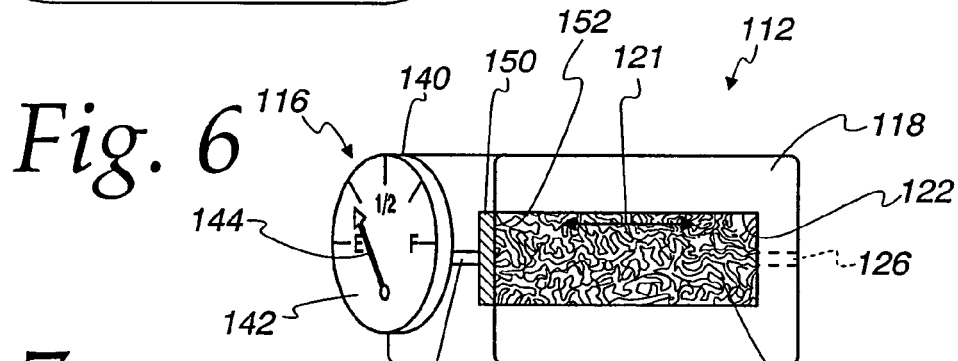
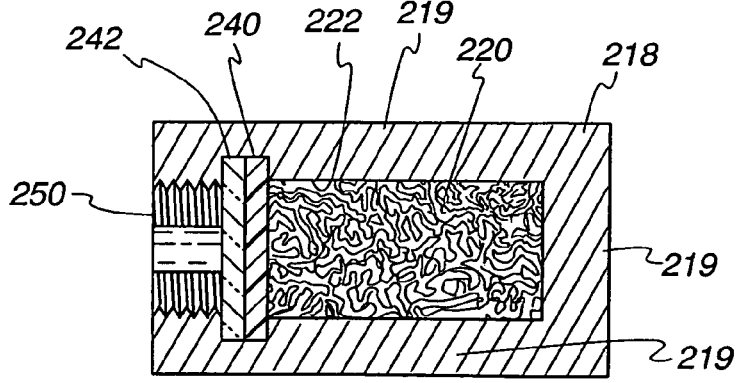

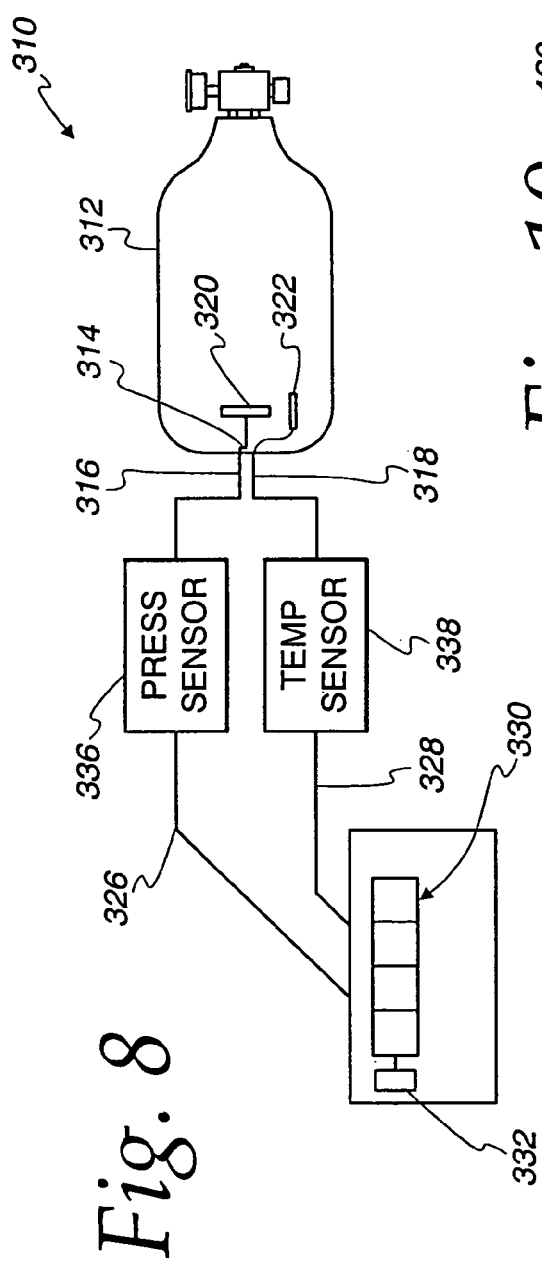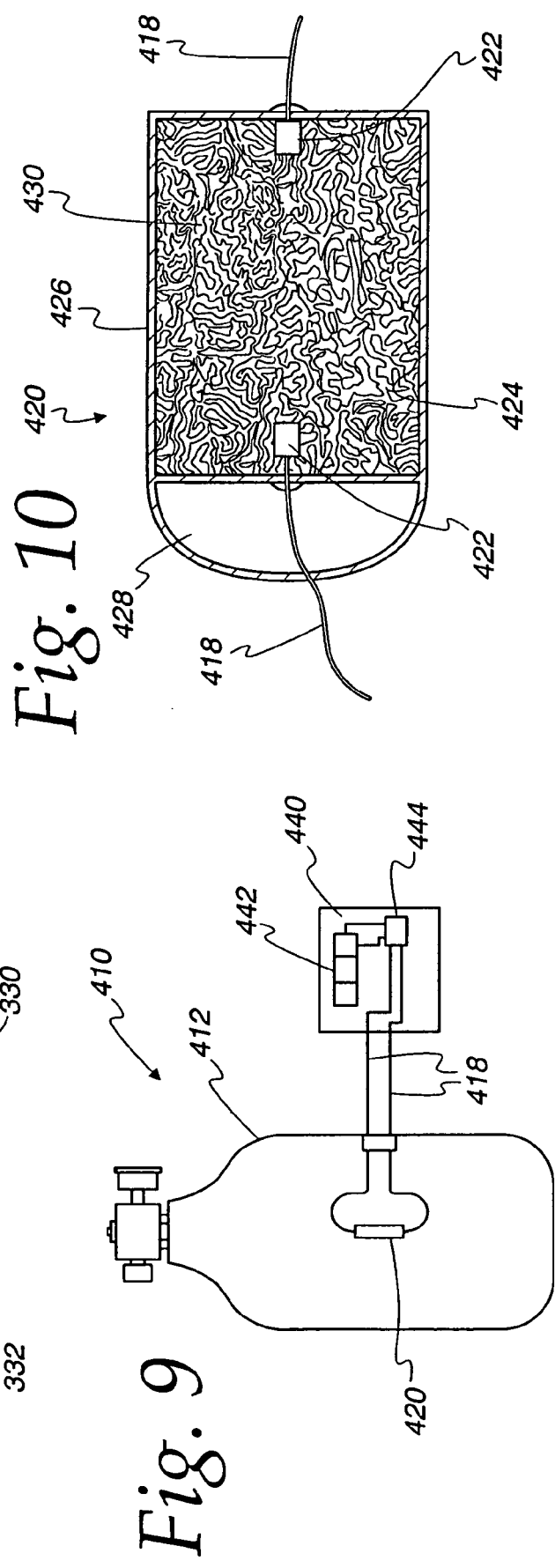

FUEL GAUGE FOR HYDROGEN STORAGE MEDIA

BACKGROUND OF THE INVENTION

1. Field of the Invention

This invention relates generally to hydrogen storage devices and more particularly relates to such devices utilizing metal hydrides for storage of high volume of hydrogen at lower pressures.

2. Background Art

With the increasing use of hydrogen gas in industrial and commercial applications, conventional methods of storing hydrogen as a gas under pressure are seen to present undesirable risks. Hydrogen storage as a gas is typically done in large, bulky steel cylinders at very high pressures (e.g., 2,000 psi).

Hydrogen may be stored in liquid form, typically in insulated containers at very low temperatures. Energy must be used to keep the temperature low to prevent the liquid hydrogen from evaporating or boiling off. Hence, cryogenic hydrogen production and storage is highly inefficient because of the extremely cold temperatures at which the storage vessels must be maintained.

More recently, attention has been directed to the storage of hydrogen in metallic compounds, known as hydrides. Metal hydrides can store large amounts of hydrogen at low pressures and in relatively small volumes. Low pressure storage of hydrogen in containers containing hydrides is relatively safe and allows the construction of hydrogen containers having forms significantly different than those storing gaseous hydrogen. Examples of low pressure hydride storage containers can be found in commonly assigned U.S. Pat. Nos. 5,250,368, 5,532,074 and 5,623,987, which are incorporated by reference herein.

Additionally, hydrogen storage containers are sold by the assignee of the invention under the trade name Ergenics ST-Series hydrogen storage units utilizing hydrides manufactured by the assignee hereof, for example, HY-STOR® 208 hydride alloys. Additional information about these storage units and hydride alloys is available on the website of the assignee of this invention, found at www.ergenics.com. The use of solid hydridable materials to store hydrogen is also disclosed in numerous patents, such as U.S. Pat. Nos. 3,508,514, 3,516,263, 4,036,944, 5,518,528, 5,697,221 and 5,906,792.

Such metal hydride storage units have many uses and applications in a variety of industrial and laboratory applications and environments. The diversity of applications requires a storage system that can provide the user with a reliable source of hydrogen at a variety of capacities. Small storage units are commonly used as hydrogen sources for laboratory experimentation, as in the examples described above. Much larger units are needed to provide the quantity of hydrogen necessary for vehicular transportation systems or in utility applications. Hydrogen storage systems are needed that will allow for quick and easy use of the hydrogen gas, and the storage system, regardless of the size and capacity of the container, must be robust enough to perform properly and reliably under a wide range of environmental conditions.

Another major consideration is the ability of a user of a hydrogen storage device to measure or gauge the amount of hydrogen gas in the hydride container available for further utilization, as and when needed. An accurate gauge is ideal, but even a gauge of the amount of hydrogen gas availability is desirable that is accurate to within 15–30%.

The construction and normal operation of known metal hydride hydrogen storage systems make it especially difficult to accurately gauge the amount of hydrogen gas available. It is possible to accurately estimate the amount of hydrogen gas available in the above described gas containers which store hydrogen in a gas state from the ideal gas law (PV=nRT), because the amount of hydrogen is directly proportional to the pressure, when temperature is maintained at a constant value. This is possible because in those types of storage systems, the volume, V, and temperature, T, remain essentially constant as an amount of hydrogen gas (n) is utilized and being withdrawn from the system. The utilization of hydrogen gas, as it is withdrawn from the container is indicated by a reduction in the amount of hydrogen (n), and produces a directly proportional reduction in pressure, P. Thus, it is possible to estimate to a very accurate degree, the amount of hydrogen gas available in the container by an accurate reading of the pressure, P.

However, because the hydrogen gas is incorporated into the lattice structure of the metal hydride, storage containers using hydrides cannot rely on the pressure P as a directly proportional measure of the amount of hydrogen gas (n) remaining in the container. It is thus necessary to provide a fairly accurate measure of hydrogen gas contained within a container, similar to a fuel gauge in a standard internal combustion automobile.

SUMMARY OF THE INVENTION

Accordingly what is described and claimed as Applicants' invention is a hydrogen gas storage container having a canister with at least one outlet opening for charging and discharging gas, the canister enclosing a metal hydride capable of absorbing and desorbing hydrogen gas and a gauge for measuring the capacity of hydrogen remaining within the hydride material. To further permit distribution of the hydrogen throughout the hydride, a porous matrix may be disposed within said metal hydride material for providing efficient distribution of hydrogen gas to said metal hydride material. The fuel gauge may further comprise subassemblies for determining the hydrogen capacity, and may depend on different principles, for example, a pressure gauge sensitive to the plateau pressure indicative of the hydrogen capacity, a piezoelectric sensor that in combination with a rigid chamber in which hydride material is closely packed provides a pressure differential indicative of hydrogen capacity, or a resistivity sensor that in combination with a chamber in which hydride material is packed provides a resistance differential indicative of hydrogen capacity.

BRIEF DESCRIPTION OF THE DRAWING FIGURES

FIG. 4 illustrates a second embodiment of the fuel gauge indicator according to the present invention.

FIG. 5 illustrates yet another embodiment of the present invention.

FIG. 6 is a detailed view of the indicator portion of the inventive hydride storage container shown in FIG. 5.

FIG. 7 illustrates another embodiment of the invention modifying the embodiment illustrated in FIG. 5.

FIG. 8 illustrates yet another embodiment of a fuel gauge system according to the present invention.

FIG. 9 illustrates yet another embodiment of the present invention.

FIG. 10 is a detailed cross-sectional view of the embodiment shown in FIG. 9.

DETAILED DESCRIPTION OF THE PREFERRED EMBODIMENTS

Figure 1:
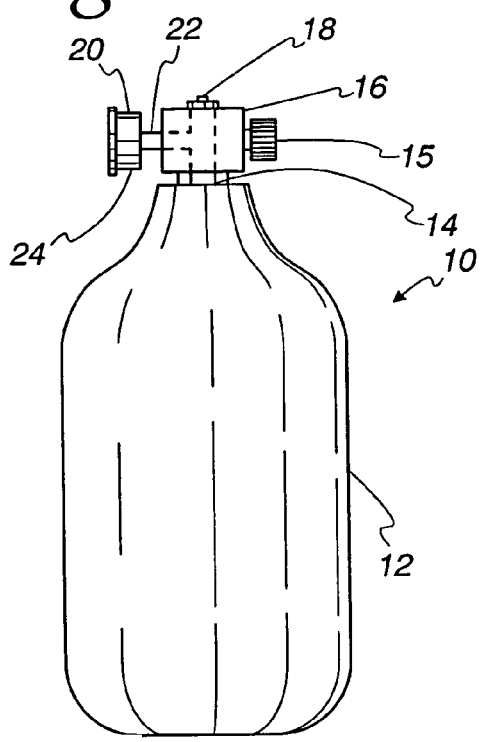
FIG. 1 illustrates in an elevational view a hydrogen storage device according to the present invention.

A hydrogen gas storage device 10, according to one embodiment of the present invention is shown in FIG. 1. The storage device 10 comprises a storage canister 12, normally steel or aluminum bottles used for containing a hydride material for storing hydrogen, such as that disclosed in commonly assigned U.S. Pat. No. 4,396,114. The device 10 further includes an opening 14 through which the hydrogen is charged or discharged from the canister 12. The opening 14 is closed off by a hermetically sealed valve 16, controlled by a knob 15, such as are known in the prior art. Turning the knob 15 to a closed position closes off the valve 16, which should remain closed as long as the canister is not connected to another connected device (not shown) that utilizes the hydrogen stored within the canister 12, for example, a fuel cell, a nickel hydrogen electrochemical cell or a hydrogen combustion engine (not shown). The valve 16 includes a fluid outlet 18 through which the hydrogen is charged or discharged only when the fluid outlet 18 is directly connected to either a hydrogen charging or discharging connected device. In this embodiment, a fuel gauge 20 is attached to the valve 16 by a fluid communication member 22. The fuel gauge 20 may take one of several forms according to one of the several embodiments of the invention described below.

Figure 3:
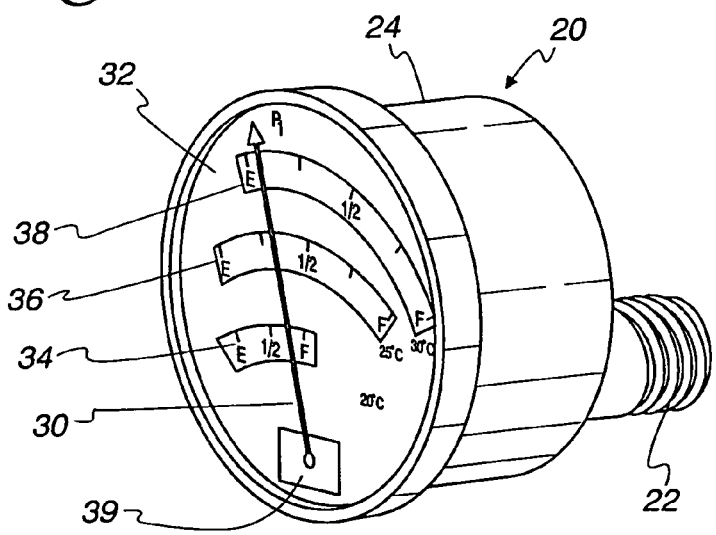
FIG. 3 illustrates in a perspective view a first embodiment of the fuel gauge according to the present invention.

Referring now to FIGS. 1 and 3, FIG. 3 illustrates a detailed section of the fuel gauge 20 shown in a perspective view. The fuel gauge 20 comprises a fluid communication member 22 for connection to the valve 16. Fluid communication member 22 provides fluid communication between a fuel gauge body 24 and the valve 16 so as to indicate the pressure of the hydrogen contained within the canister 12. The body of the fuel gauge 24 may comprise a standard hydrogen pressure gauge, as is known for other gases. The fuel gauge/pressure gauge also has a front face 32 in which an indicator indicates the pressure of the hydrogen within the canister 12. The indicator may comprise a needle indicator 30, as shown.

The face 32 of the gauge 20 is different from other pressure gauges in that it has a plurality of scales, as will be explained below with reference to the graph in FIG. 2. Several scales are necessary in order to be able to accurately gauge the amount of hydrogen capacity left within the canister 12. As is known in the hydriding field, the pressure of hydrogen gas being stored within a hydride does not correlate directly with the pressure of the hydrogen within the canister, as would be expected with a general non-hydride type storage device. Furthermore, because of the peculiar characteristics of the hydriding/dehydriding process, the temperature of the hydride and the hydrogen gas within the canister also generates variability in the amount of hydrogen gas indicated as being available for use within the canister 12.

Figure 2:
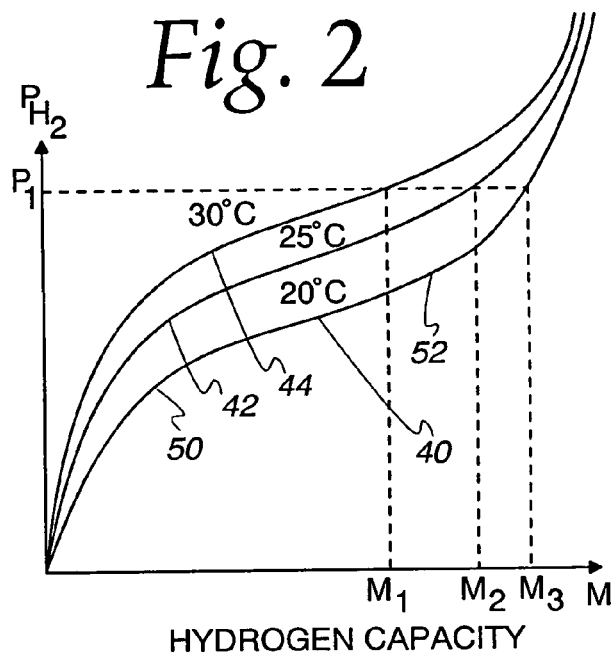
FIG. 2 is a graph showing the relationship between hydrogen capacity and hydrogen pressure at different temperatures.

Referring now to FIG. 2, a graph of the hydrogen capacity of a hydride M is correlated with the pressure within the canister 12 of the hydrogen gas labeled $P_{H2}$. The characteristics of hydrides require an increased amount of hydrogen to be absorbed by the hydride upon initial charging of the canister 12 with a hydrogen gas. As the hydrogen gas is absorbed by the hydride, an equilibrium pressure is reached in the canister 12 between the hydrogen that is absorbed within the hydride and the hydrogen gas freely floating within the hydrogen gas canister 12. As additional pressurized hydrogen continues to be charged into the canister 12, the hydrogen continues to be absorbed by the hydride at a slow rate until a point is reached within the pressure equilibrium curve, which is known as the plateau pressure.

The plateau pressures of the isotherms 40, 42, 44 are shown in FIG. 2. The plateau pressure of isotherm 40, indicating the pressure taken at a constant temperature of 20° C., begins at a point approximately around 50 and ends at a point approximately around 52. Isotherm 40 is described herein in an example to indicate how the amount of hydrogen being absorbed as the pressure of the hydrogen gas is increased varies with the pressure as additional pressurized hydrogen gas is introduced into canister 12. The flattening of the isotherm curve between points 50 and 52, generally recognized in the hydride field as the plateau pressure, provides the means through which this embodiment of the invention is made effective.

The plateau pressure of isotherm 40 indicates that absorption of the hydrogen gas into the hydride is most rapid during the slow pressure increase of the plateau, between points 50 and 52. As can be seen, isotherm 40 provides an increased capacity at the plateau pressure, as do the other isotherms 42 and 44. Thus, a fuel gauge that is calibrated to render it sensitive to slight variations in pressure at or around the plateau pressures would be able to provide a reasonable indication of the hydrogen capacity contained within the hydride disposed within the canister 12.

The phenomenon of hydrogen gas absorbed by the hydride over varying temperatures is a result of the isotherm of an equilibrium pressure being measured while the temperature is maintained at a constant temperature, as shown in FIG. 2. On the other hand, if the pressure of the hydrogen gas in the canister 12 is maintained at a constant value, for example, as shown in FIG. 2, the hydrogen capacity M of the hydride increases with decreasing temperature at constant pressure $P_1$. That is, as the temperature is decreased from the isotherm 44 (30° C.) to isotherm 42 (25° C.), the capacity increases from $M_1$ to $M_2$, and for isotherm 40, (20° C.), the capacity increases to $M_3$. Similarly, for a constant capacity, for example, $M_1$, a higher equilibrium pressure of the hydride material can be expected with increased temperature because maintaining capacity constant and increasing the temperature heats up the hydride and causes the release of hydrogen through desorption thereby increasing the pressure within the canister 12. Moreover, as can be seen from the graphs, calibration and increased sensitivity of the pressure measurement apparatus to pressures immediately below $P_1$, in the region of the plateau pressures of each of the isotherms 40, 42, 44, would more accurately gauge the remaining capacity, even though the capacity varies more steeply on the basis of smaller pressure differentials.

However, the plateau pressures as shown in FIG. 2 can only indicate a specific pressure without reference to the underlying amount of hydrogen gas and the equilibrium point which is achieved at any specific temperature. A constant pressure $P_1$, as shown in FIG. 2, would be indicative of different hydrogen capacities, i.e., $M_1$, $M_2$, $M_3$, each depending on the temperature experienced in the hydrogen gas canister 12 and the hydride material within the canister. In other words, the same pressure $P_1$ may be indicative of a greater or lesser amount of hydrogen stored within the hydride, as shown by the values $M_1$, $M_2$, and $M_3$, which is the intersection of the value $P_1$ with each of the different isotherms 44, 42, 40 respectively.

A correlation is necessary between the temperature of the contents of canister 12 and the pressure that is indicated by the fuel gauge 20, which accounts for the pressure that is indicated indicative is dependent on the temperature to accurately indicate hydrogen capacity M. Thus, referring again to FIG. 3, the face 32 of the fuel gauge 20 includes a plurality of scales 34, 36, 38, each of which indicate the temperature at which that the pressure should be gauged. A separate temperature dependent strip 39 may indicate by a varying color what temperature is being experienced by the system 10. The strip 39 can show by a color change from blue to green to red the difference in temperatures between 20° C., 25° C., and 30° C., respectively. For example, again using the isotherm 40 as an example, a pressure $P_1$ as shown by the indicator 30 is indicative that at 20° C., the equilibrium pressure isotherm indicates a capacity $M_3$ of the hydrogen within the canister 12 and by a calibration of the amount of pressure, the scale 34 indicates that the value of $M_3$ correlates to full capacity of the hydrogen in the hydride. Thus, by an indication of a blue strip 39 an observer knows that the temperature is at 20° C. The observer, who is reading the gauge 20 knows, to refer to the fuel gauge at the 20° C. temperature, i.e., to scale 34, for an indication of the capacity of the hydrogen left in the canister.

Conversely, if the strip 39 shows a green color, correlating to the 25° C. isotherm the observer will note that the scale 36 is indicative that the amount of fuel present within the canister 12 is at one half capacity. Finally, if the temperature is indicated as being red by the strip 39, i.e., that the 30° C. scale is appropriate, then the observer knows to observe the scale 38, correlating to 30° C., and would know that the fuel capacity is approaching empty.

Referring now to FIG. 4, therein as indicated a face 132 on a gauge 130 of another embodiment of the invention, in which rather than having several different scales, as does the embodiment 20 of FIG. 3, the face 132 has only one scale that is visible at any one time, which scale being visible is dependent on the temperature. Strips of temperature sensitive material, such as that used for the strip 39 (FIG. 3), and that are known and available from Omega Engineering, Inc. located at Stamford, Conn., are placed at appropriate parts of the face 132 of this embodiment of the fuel gauge. Each scale 134, 136, 138 and 140 appear and become easily visible for viewing by an observer only at the appropriate temperature. For example, if the temperature is 20° C., the blue scale 134 appears while the other scales are dark or indicate a darker color. Thus, only the scale 134 is easily visible because it is brighter than the other scales, as a result of the temperature sensitivity of the scale 132 at the temperature 20° C., and the observer knows to view only that portion of the face 132 that pertains to the isotherm scale 134, appropriate for the temperature of 20° C. Similarly, on the indicator face 132, other scales 136, 138, 140 would light up at the associated temperatures, for example, 25°, 30° or 35°, respectively. Each of these other scales is indicated by the dotted lines in the face 132 of FIG. 4. Thus, use of this particular embodiment would ensure that the correct temperature would be read because only that part of the fuel gauge face 132 would be visible to the observer at the appropriate temperature.

In another aspect of the invention, as shown in FIG. 5, the storage canister 112 has a portion 114 which provides an inset for a fuel gauge 116. Preferably, the fuel gauge 116 is inset into portion 114 disposed adjacent the bottom of canister 112, as shown in FIG. 5. Alternatively, the fuel gauge may be disposed on a side wall of a canister (not shown).

FIG. 6 is a detailed view of the fuel gauge according to this embodiment of the invention. The fuel gauge 116 comprises a container 118, defining a chamber 122, which rigidly retains a hydride alloy 120 within the chamber 122. The container 118 preferably comprises a rigid material, such as steel or similar type of material that does not expand greatly as a result of an increase in temperature. The hydride alloy material 120 is held within chamber 122 in such a way that any expansion of the hydride alloy 120 must take place within the chamber 122 along a longitudinal direction as shown by the arrows 121. The container 118 specifically comprises a longitudinally oriented chamber 122 containing the hydride alloy material 120. Preferably, the hydride alloy material within the chamber 122 is the same alloy material that is present within the remainder of the canister 112.

It is a known phenomenon that hydriding/dehydriding alloys exhibit considerable expansion during the hydrogen absorption process and may expand as much as 10 to 25% in volume as the alloy absorbed from zero capacity to full capacity hydrogen. Preferably, the hydride alloy is disposed within a longitudinally extending container so as to magnify the effects of the expansion process by the shape of the container. Thus, the increase in hydrogen capacity within the specific alloy can provide greater or lesser expansion pressure depending on the amount of hydrogen that has been absorbed within that alloy.

In order for the hydrogen to be absorbed and to be indicative of the amount of hydrogen that has been absorbed within the alloy in the canister 112, there is preferably a means for communicating and providing the hydrogen in the same amount of pressure within the container 118 that is present in the remainder of the canister 112. Thus a communication means is disposed between the canister 112 and the chamber 122, such as a perforated screen (not shown) or aperture 126, as indicated in FIG. 6. The following embodiments of the invention each depend on the specific structure of the inset 114, as shown in FIG. 5, so that the different pressure sensitive means of showing the amount of hydrogen capacity left within the canister 112, according to each of the several embodiments described below, will be indicative of the invention as described.

In one embodiment of the invention utilizing the chamber illustrated in FIG. 6, the fuel gauge is connected to and works directly with a diaphragm 150. The fuel gauge 140 may be a standard gauge showing the amount of expansion of the alloy in the chamber 122 by means of a single scale on the face 142 of the gauge 140 and a needle indicator 144, as shown. The face 142 may have a shape and dimensions that match the size of the aperture 116 in the wall of canister 112. Thus a person desiring to gauge the capacity of hydrogen left in the canister 112 need simply to view the face 142 to see the needle indication of metal hydride material expansion, which roughly correlates to the amount of remaining hydrogen capacity.

A single scale is shown on face 142 because the physical volumetric expansion of the contained metal hydride material depends to a much greater extent on the amount of hydrogen that is contained in the hydride material than it depends on the temperature of the hydride material. The correlation of volumetric expansion is so much more dependent on the hydrogen absorption amount that the temperature expansion effect can be effectively disregarded. However, should a more accurate reading be desired, so as to take into account the volumetric expansion of the hydride material which is contributed by an increase in temperature, a calibrated scale can also be provided to the face 142, similar to those of the faces 32, 132 shown respectively in FIG. 3 or 4.

The diaphragm 150 (FIG. 6) of the container 118 closes off fluid or gas communication so as to provide a hermetic seal of the canister 112 at aperture 116. The diaphragm 150, either directly or indirectly is in contact with the portion of the hydride material 120, which is capable of expansion in the direction of arrow 121, expansion in the other directions being constrained by the rigid nature of the walls of container 118. Thus, with correct packing of the hydride material 120, all of the volumetric expansion is translated into the longitudinal direction, shown by arrow 121. Utilizing the principles of hydraulic motion, a small aperture size of the opening 152, covered by the diaphragm 150, translates a 10–25% volumetric expansion of the hydride material 120 into a strong, longitudinal actuation pressure acting on the diaphragm 150. A post 156 connects the diaphragm 150 to the gauge 140, so that the longitudinal variation in the post 156 turns the needle 144 to the appropriate indication of hydrogen capacity in the metal hydride material 120 within the chamber 118.

The metal hydride material 120 is preferably identical to that of the metal hydride material in the canister 112, so that the hydrogen absorption characteristics of the hydride material contained are the same. That is, good packing of the hydride material 120 and effective distribution of the hydrogen gas introduced through the fluid communication conduit 126 will cause identical hydrogen absorption, and consequently, identical volumetric expansion of the hydride material, thus providing a reasonably accurate reading of the hydrogen capacity of the canister 112.

Alternatively, a different alloy material which is more susceptible to volumetric expansion, may be utilized within the chamber 122, so as to further magnify the effect of the hydrogen expansion. That is, metal hydride alloy material, which expands more than the general hydride material in the canister 112, will provide greater relative fluctuation in the volume of hydride material within the chamber 122, thus permitting greater precision in the reading of the scale on face 142. If two different metal hydrides are utilized, care must be taken so that the plateau pressures of each of the hydrides can be correlated so as to accurately calibrate the scale.

Referring now to FIG. 7, another embodiment of the container 218 is disclosed, which has dimensions and a shape permitting its insertion within the aperture 116 of canister 112 (FIG. 5). Container 218 comprises rigid walls 219, an aperture 222, and a metal hydride material 220, which may be identical to the hydride material in the canister 112. A fluid communication conduit (not shown) may not be necessary in this or any of the other above described embodiments, if the rigid constraining walls 219 of container 218 comprise a material that retains its rigidity, but is also porous to hydrogen gas. This arrangement is preferable, in that more efficient and even distribution of hydrogen within the chamber 218 is possible, permitting the hydrogen gas to be absorbed by the metal hydride material 220 evenly, thus providing continuous expansion characteristics.

Of course, other means of display are possible with the inventive fuel gauge. For example, the diaphragm may be coupled with an electronic pressure indicator or other type of indicator that provides the required information to the operator. For example, as shown in FIG. 7, the rigid container 218 provides a diaphragm 240 comprising a pressure sensitive plastic, that changes color, for example, from blue to red, depending on the amount of pressure it is experiencing. The pressure sensitive plastic diaphragm 240 may be retained in place snugly against the metal hydride material 220 by a glass cover 242 and a threaded bezel 250 that, when screwed into place, impinges on the glass cover 242 so as to seal the aperture 222 and prevent hydrogen gas leakage outside of canister 112.

The pressure sensitive plastic diaphragm 240 would have characteristics that produce a change to a different color, depending on the amount of longitudinal pressure exerted on the diaphragm 240 by the hydride material 220 contained within the chamber 222. For example, the diaphragm may be set to show a blue color when the hydrogen has been depleted from the hydride material so that no expansion of the hydride material is evident, it could show a green color when there is about ½ capacity, when measured at or near the plateau pressure, as shown in FIG. 2, and could be a red color when the hydrogen is fully charged in the hydride material and no further hydrogen can be absorbed by the hydride material 220. Of course, the pressure exerted by the hydride material acting on the diaphragm 240 would be affected by the longitudinal pressure exerted by the hydride material 220. It is contemplated that the volumetric expansion pressure would be greater than the gas pressure exerted by the hydrogen gas within the chamber 222. Appropriate means, such as a screwable adjustment of the bezel 250, may be necessary to further calibrate the color code of the diaphragm 240 against the hydrogen capacity of the hydride material in the canister 112.

Referring now to FIG. 8, another embodiment of the inventive fuel gauge 310 is shown, comprising a canister 312, and including a port 314 through which lead lines 316, 318 extend into the canister 312. The two lead lines 316, 318 are each connected to condition sensors that sense conditions within the canister 312. For example, lead lines 316 are connected to a pressure transducer (not shown) within the canister that can sense either the hydrogen gas pressure within the canister 312 or preferably, on the pressure sensed by a piezoelectric transducer 320 within the canister 312. The pressure sensor transducer may provide for a direct reading of the hydrogen gas pressure, or may have a container (not shown), similar to container 218 (FIG. 6), which is sensitive to the pressure exerted by a self contained hydride material unit. In either case, the transducer 320 generates an electric signal which corresponds to a pressure value and transmits it to a programmable logic controller (PLC) or micro processor 330, preferably disposed outside of the canister 312, as shown by dotted lines 326.

A second set of lead lines 318 is connected to a temperature sensor 322 also disposed within the canister 312, which may comprise, for example, a thermocouple or a resistance temperature device (RTD). The temperature sensor 322 also generates a signal through lead lines 318, which is also transmitted to the central processor 330 through dotted lead lines 328.

The processor 330 receives the signals transmitted by the sensors 320, 322, and through electronic manipulation using a predetermined algorithm, can compute a value for the hydrogen capacity within the canister 312. That value may be an analog or, preferably, a digital value, which may be displayed by a display 332 connected to the central processor 330. Alternatively, or in conjunction with the central processor 330, the values of the pressure and temperature sensed by sensors 320, 322 may independently corroborate that the hydrogen capacity display 332 is providing reasonable data, or the operator may utilize the data on displays 336, 338, disposed in line with the lead lines 316, 318, respectively, to independently determine the hydrogen capacity for example, by reference to a table.

Alternatively, the displays may themselves be displayed, for example, by displays 336, 338, respectively, from which values an operator either the hydrogen gas pressure within the canister 312 or alternatively, on the piezoelectric pressure sensed by a transducer 320 within the canister 312. The lead lines 316, 318 may be attached permanently to the sensor ports 314, or the lead lines may be detachable and provided with a potable microprocessor unit 330 that may be attached to the ports 314 when information about the conditions in the canister 312 is desired.

Yet another embodiment of this invention is illustrated in FIGS. 9 and 10. A hydrogen storage device 410 includes a storage canister 412 having an inset portion 414 disposed in the side of the wall of canister 12, although the disposition of the inset portion 414 may be in the bottom wall of the canister 412, as shown in the embodiment of FIG. 5, or even in the valve 416 (not shown). The inset portion 414 comprises a port for a set of insulated lead wires 418 to provide an electrical connection to a resistance member 420 within the canister 412 and will be described in greater detail below with reference to FIG. 10.

External to the canister 412, the lead lines 418 are electrically connected to a device 440 for measuring electrical resistance. The device 440 may include a display 442, as shown, that indicates resistance or, alternatively, indicates the hydrogen capacity from the electric resistance signal received from the lead wires 418 and a calibrated algorithm may be accessed on a logical control circuit 444 within the device 440 so as to calculate the hydrogen capacity from the resistance signal received from within the canister 412. The lead lines 418 may also be usable with a portable stand alone resistance measuring device 440, the lead lines 418 being temporarily attachable to electrical inlet plugs (not shown) disposed within the inset portion 414, for example, similar to an electrical outlet. This feature would permit an operator to carry the measurement device 440, plug in the lead lines 418, measure the hydrogen capacity, withdraw the lead lines 418 from the inset plug and continue to monitor other devices 410.

The principle, upon which device 410 operates, depends on another characteristic of hydrides, which correlates increasing resistivity with increasing hydrogen capacity. While a direct correlation has not been definitively established, it is a smooth enough correlation to provide an accurate gauge of hydrogen capacity, after proper calibration. That is, since the increase in resistivity provides a known correlation with the hydrogen capacity contained within the hydride, knowledge of the local electrical resistance of the hydride can be translated directly to a value of hydrogen capacity. Within the context of the metal hydride alloy materials contemplated for use in this invention, it is known that the resistance may vary up to 200% between a value when no hydrogen is contained by the hydride and at or near the full saturation point of the hydride material by pressurized hydrogen.

Referring now to FIG. 10, the resistance member 420 of FIG. 9 is shown in a detailed cross-sectional view. Resistance member 420 is internally disposed within the canister 412, but communicates by means of electrical signals transmitted through the electrical leads 418 at the inset 414, as described above. Electrical lead lines 418 each terminate at terminals 422 that are embedded within a tightly packed internal chamber 424. It is preferable that the chamber 424 has cylindrical walls 426 and end walls 428 defining a cylinder and the terminals 422 are spaced from each other and each disposed adjacent either of the two end walls 428 of the cylinder. Alternatively, other shapes may be utilized, for example, hexagonal or square shapes as viewed in cross-section.

The walls 426, 428 of the chamber 424 comprise an electrically insulating material that is permeable to hydrogen gas, for example Teflon® available from E.I. du Pont de Nemours and Company, of Wilmington, Del. The permeability of the material comprising walls 426, 428 permits the hydrogen to be absorbed and desorbed freely and equally by hydride alloy material 430 within the chamber 424. The spatial separation between the terminals 422 may be predetermined so as to provide a desired resistance between the terminals for a chamber 424 of specified size.

The chamber 424 is packed tightly with the metal hydride material 430, in powder form, to a predetermined density to provide a predetermined resistance level, which varies depending on hydrogen capacity of the hydride material 430. Preferably, the hydride material is identical in both the chamber 424 and in the remainder of canister 412, so that the hydrogen capacity of the hydride material matches throughout the device, thus providing an accurate reading of the hydrogen capacity of the hydride material within the canister 412.

During operation, a signal is transmitted from the resistance member 420 that is indicative of the resistance between the terminals 422, and is also essentially identical to the resistance of the hydride material within the canister 412. This signal is sent to a resistance measuring device 440, which analyzes the signal and utilizing calibrated algorithm accessed in the logical control circuit 444 determines the hydrogen capacity in the metal alloy hydride material in the canister 412. This embodiment provides some advantage in that the resistance measuring device 440 also absorbs hydrogen, and thus the space taken up by device 440 is not underutilized, but is utilized in the storage of the hydrogen.

Other modifications and alterations may become apparent to a person having skill in the art from an understanding of the present invention. For example, different combinations of sensors and/or colored indicators may be modified or substituted for those disclosed. Alternatively, other types of conditions may be sensed by other types of sensors not described in detail herein. For example, a weight sensor may be provided, either internally within the canister or outside, that measures the weight of the hydride material, using a tare weight for the bottle and valves, if externally measured, to provide an alternative or additional measure of hydrogen capacity. Also, Hall effect measurements of a material, such as a hydride material, are known to change the material's electromagnetic properties with increasing hydrogen capacity. It is contemplated that such a sensor may gauge the hydrogen capacity of an enclosed hydride material by inducing a magnetic field and measuring the electrical properties, such as voltage, of the material. Calibration of the material against known capacities would be required to provide accurate readings.

The above-described embodiments of the inventive hydrogen fuel gauge are to be considered as illustrative only and not limiting, the invention only being limited by the following claims.

What is claimed is:

1. A hydrogen storage container configured for containing at least hydrogen gas and a hydrogen storage composition, comprising:

a hydrogen storage composition disposed within the container, said hydrogen storage composition being free of a binder capable of measuring a characteristic of the hydrogen storage composition or of the hydrogen capacity within the container; and a fuel gauge including a sensor in communication with the hydrogen storage composition and configured for sensing a characteristic of the hydrogen storage composition which is indicative of an amount of hydrogen absorbed by the hydrogen storage composition.

2. The hydrogen storage container as claimed in claim 1, wherein the fuel gauge further includes a processor coupled to the sensor and configured for calculating an amount of hydrogen absorbed by the hydrogen storage composition based on a correlation between at least the sensed characteristic and the amount of hydrogen absorbed by the hydrogen storage composition.

3. The hydrogen storage container as claimed in claim 2, wherein the characteristic comprises a volume occupied by the hydrogen storage composition.

4. The hydrogen storage container as claimed in claim 2, wherein the characteristic comprises a change in volume occupied by the hydrogen storage composition.

5. A hydrogen storage container configured for containing at least hydrogen gas and a hydrogen storage composition, comprising:

a hydrogen storage composition disposed within the container; and a fuel gauge including a sensor in communication with the hydrogen storage composition and configured for sensing a characteristic of the hydrogen storage composition which is indicative of an amount of hydrogen absorbed by the hydrogen storage composition, the fuel gauge further including a processor coupled to the sensor and configured for calculating an amount of hydrogen absorbed by the hydrogen storage composition based on a correlation between at least the sensed characteristic and the amount of hydrogen absorbed by the hydrogen storage composition, wherein the characteristic comprises a pressure exerted by the hydrogen storage composition.

6. The hydrogen storage container as claimed in claim 5, wherein the sensor further comprises a pressure sensor.

7. The hydrogen storage container as claimed in claim 6, further comprising a temperature sensor disposed within the container for sensing a temperature representative of the temperature of the hydrogen storage composition.

8. The hydrogen storage container as claimed in claim 2, wherein the characteristic comprises a change in pressure exerted by the hydrogen storage composition.

9. The hydrogen storage container as claimed in claim 2, wherein the characteristic comprises electrical resistance of the hydrogen storage composition.

10. A hydrogen storage container configured for containing at least hydrogen gas and a hydrogen storage composition, and defining a first chamber and a second chamber, wherein the first chamber is in fluid communication with the second chamber, comprising:

a hydrogen storage composition disposed within each of the first and second chambers, said hydrogen storage composition being free of a binder capable of measuring a characteristic of the hydrogen storage composition or of the hydrogen capacity within the container; and a fuel gauge including a sensor in communication with the hydrogen storage composition in one of the first or second chambers, and configured for sensing a characteristic of the hydrogen storage composition disposed in the one of the first and second chambers, the characteristic being indicative of an amount of hydrogen absorbed by the hydrogen storage composition in the other one of the first and second chambers.

11. The hydrogen storage container as claimed in claim 10, wherein the fuel gauge further includes a processor coupled to the sensor and configured for calculating an amount of hydrogen absorbed by the hydrogen storage composition in the other one of the first and second chambers based on a correlation between at least the sensed characteristic and the amount of hydrogen absorbed by the hydrogen storage composition in the one of the first and second chambers.

12. The hydrogen storage container as claimed in claim 11, wherein the characteristic comprises a volume occupied by the hydrogen storage composition.

13. The hydrogen storage container as claimed in claim 11, wherein the characteristic comprises a change in volume occupied by the hydrogen storage composition.

14. The hydrogen storage container as claimed in claim 11, wherein the characteristic comprises a pressure exerted by the hydrogen storage composition.

15. The hydrogen storage container as claimed in claim 14, wherein the sensor further comprises a pressure sensor.

16. The hydrogen storage container as claimed in claim 15, further comprising a temperature sensor disposed within the container for sensing a temperature representative of the temperature of the hydrogen storage composition in the one of the first and second chambers.

17. The hydrogen storage container as claimed in claim 11, wherein the characteristic comprises a change in pressure exerted by the hydrogen storage composition.

18. The hydrogen storage container as claimed in claim 11, wherein the characteristic comprises an electrical resistance of the hydrogen storage composition.

* * * * *